United States Patent
Choi et al.

(10) Patent No.: US 9,508,995 B2
(45) Date of Patent: Nov. 29, 2016

(54) LAMINAR STRUCTURE AND A PRODUCTION METHOD FOR SAME

(75) Inventors: Han Shin Choi, Chungcheongnam-do (KR); Hye Sook Joo, Seoul (KR)

(73) Assignee: KOREA INSTITUTE OF INDUSTRIAL TECHNOLOGY, Chungcheongnam-Do (KR)

( * ) Notice: Subject to any disclaimer, the term of this patent is extended or adjusted under 35 U.S.C. 154(b) by 315 days.

(21) Appl. No.: 14/124,702

(22) PCT Filed: Jun. 8, 2012

(86) PCT No.: PCT/KR2012/004558
§ 371 (c)(1),
(2), (4) Date: Dec. 6, 2013

(87) PCT Pub. No.: WO2012/169836
PCT Pub. Date: Dec. 13, 2012

(65) Prior Publication Data
US 2014/0120457 A1    May 1, 2014

(30) Foreign Application Priority Data

Jun. 9, 2011  (KR) .......................... 10-2011-0055459

(51) Int. Cl.
*H01M 8/02* (2016.01)
*H01M 4/88* (2006.01)
*H01M 8/10* (2016.01)

(52) U.S. Cl.
CPC .......... *H01M 4/8832* (2013.01); *H01M 8/1004* (2013.01); *H01M 2008/1095* (2013.01); *Y02E 60/521* (2013.01); *Y02P 70/56* (2015.11)

(58) Field of Classification Search
CPC ........... H01M 4/8605; H01M 8/1004; H01M 4/8832
See application file for complete search history.

(56) References Cited

U.S. PATENT DOCUMENTS

2004/0038808 A1* 2/2004 Hampden-Smith ...... B01J 21/18
                                                          502/180
2006/0164450 A1* 7/2006 Hoisington .......... B41J 2/04581
                                                          347/10

FOREIGN PATENT DOCUMENTS

| JP | 2007-250312 A | 9/2007 |
| KR | 10-2008-0067837 A | 7/2008 |
| KR | 10-2009-0017838 A | 2/2009 |
| KR | 10-2009-0109195 A | 10/2009 |

OTHER PUBLICATIONS

Jaworek (J Mater Sci (2007) 42:266-297).*

* cited by examiner

*Primary Examiner* — Stewart Fraser
*Assistant Examiner* — Olatunji Godo
(74) *Attorney, Agent, or Firm* — Rabin & Berdo, P.C.

(57) ABSTRACT

The present invention relates to a laminar structure which is used in a microporous layer, an electrode layer or the like of a membrane electrode assembly for a fuel cell, and also relates to a production method for same. The laminar structure is a laminar structure which is comprised in the membrane electrode assembly (MEA) of a polymer electrolyte membrane fuel cell (PEMFC), and comprises an electrosprayed layer which is formed by the lamination of electrospraying ink, that has been charged by means of an electric field, through an electrospraying process in which the electrospraying ink is dispersed and sprayed as electrospraying liquid droplets, and, in the electrospraying process, the electrospraying substance transmission mode is set in accordance with the adjustment of electrospraying process variables. When the present invention is employed, an optimal substance transmission route is formed and three dimensional structure control is allowed through the electrospraying process and/or an inkjet printing process, and thus it is possible to simultaneously ensure economic advantages and durability when producing a laminated structure which is used in a microporous layer, an electrode layer, or the like of a membrane electrode assembly for a fuel cell.

14 Claims, 8 Drawing Sheets

(a) As-deposited MEA I-V behavior (b) Activated MEA I-V behavior

Fig. 8

(a) 10 BC substrate surface (b) 10 BC substrate cross-section (c) coarse droplet-applied electrode surface(3kV) (d) coarse droplet-applied electrode cross-section(3kV)

(e) fine droplet-applied electrode surface(4.5kV) (f) fine droplet-applied electrode cross-section(4.5kV)

(g) Cone-jet mode-applied electrode surface(9kV) (h) Cone-jet mode-applied electrode cross-section(9kV)

Fig. 9

LAMINAR STRUCTURE AND A PRODUCTION METHOD FOR SAME

TECHNICAL FIELD

The present invention relates to a laminar structure which is used in a micro-porous layer, or electrode layer for a membrane-electrode assembly for a fuel cell, and a production method thereof.

BACKGROUND ART

The high-carbon society that is heavily relying on fossil fuel-based growth will change to low-carbon society and then to hydrogen society where continuous growth is possible. For such a turn into hydrogen society, the polymer electrolyte membrane fuel cell (PEMFC) has been categorized as the technology to utilize hydrogen and investigated for a considerable period of time on its potential for industrialization. The PEMFC has larger current density and power density compared to other forms of fuel cells, while it has relatively smaller volume and weight, thus is actively researched and developed for the purpose of commercialization in the field of transportation equipments worldwide.

For the commercialization, above all, it is necessary to ensure economical and durability aspects of the PEMFC itself. The cost of currently available PEMFC includes cost for the membrane-electrode assembly (MEA) which takes up about 45% of the total cost, and electrode material using platinum (Pt) within the membrane-electrode assembly (MEA) which takes up ⅔ of the total cost. In other words, the Pt electrode takes up about 30% the total cost.

The automobile industry anticipates that the vehicles on PEMFC would enter growing period by 2020, with the use of Pt for the PEMFC increasing as high as 25 times or above, compared to the conventional internal combustion engines. It is thus anticipated that the use of Pt per vehicle will increase greatly. Considering the fact that South Africa has 88% of the world's platinum elements containing Pt therein, there are always the problems such as uneven resources distribution and supply and demand instability.

Accordingly, the platinum (Pt) price is expected to continue to rise and the issue of PEMFC price can hardly be addressed sufficiently even when the costs of the other materials are greatly reduced. Accordingly, the technology to reduce use of Pt in the MEA is considered to be the key technology as far as PEMFC is concerned.

DISCLOSURE

Technical Problem

The present invention has been made to overcome the problems mentioned above, and accordingly, it is an object of the present invention to provide a laminar structure and a production method thereof which can address both the durability and economic aspects of the fuel cell together.

Technical Solution

In one embodiment to achieve the above objects, a laminar structure for inclusion in a membrane-electrode assembly (MEA) of a polymer electrolyte membrane fuel cell (PEMFC) is provided, which may include an electrosprayed layer formed by lamination of an electrospraying ink, which is electrically charged in electric field, in an electrospraying process in which the electrospraying ink is dispersed and sprayed as electrospraying droplets, in which the electrospraying process may set an electrospraying substance transport mode according to adjustments of electrospraying process variables.

The electrospraying process variables may include a feed rate of feeding the electrospraying ink, and a strength of applied voltage to form the electric field.

The electrospraying substance transport mode may include a drop mode in which the electrosprayed layer is formed into dot-like pattern, and a jetting mode in which thickness of the electrosprayed layer and structure of pores formed in the electrosprayed layer are controlled, in which the jetting mode may be set when the feed rate of feeding the electrospraying ink is greater, or when the strength of the applied voltage is greater than in the drop mode.

The laminar structure may additionally include an inkjet layer which is formed by lamination of an inkjet ink in an inkjet printing process in which the inkjet ink is jetted out of an inkjet nozzle, in which the ink printing process may set an inkjet substance transport mode according to adjustments of inkjet process variables.

The inkjet process variables may include a size of the inkjet nozzle, and a cycle of jetting the inkjet ink.

The inkjet substance transport mode may include a dot mode deposition in which the inkjet ink is jetted in a form of inkjet droplets so that the inkjet layer is formed into a dot-like pattern, and a line mode deposition in which the inkjet ink is continuously jetted so that the inkjet layer is formed into a line pattern, in which the line mode deposition may be set, when the size of the inkjet nozzle is greater, or the cycle of jetting the inkjet is shorter than in the dot mode deposition.

The electrosprayed layer may be a micro-porous layer (MPL) formed on a surface of a gas diffusion layer (GDL).

The micro-porous layer may be provided as a monolithic structure or a porous graded structure, according to the adjustments of the electrospraying substance transport mode.

One or more electrosprayed layers may be formed, and the one or more electrosprayed layers may be continuously formed by a roll-to-roll manner.

The electrosprayed layer and the inkjet layer may be micro-porous layers (MPL) formed on a surface of a gas diffusion layer (GDL).

The micro-porous layer may be provided as a monolithic structure or a porous graded structure based on adjustments of one or more of the electrospraying substance transport mode and the inkjet substance transport mode.

One or more electrosprayed layers may be formed, one or more inkjet layers may be formed, and the one or more electrosprayed layers and the one or more inkjet layers may be continuously formed by a roll-to-roll manner.

In one embodiment, a laminar structure for inclusion in a membrane-electrode assembly (MEA) of a polymer electrolyte membrane fuel cell (PEMFC) is provided, which may include an inkjet layer formed by lamination of an inkjet ink in an inkjet printing process in which the inkjet ink is jetted out of an inkjet nozzle, wherein the inkjet printing process sets an inkjet substance transport mode according to adjustments of inkjet process variables.

The inkjet process variables may include a size of the inkjet nozzle, and a cycle of jetting out the inkjet ink.

The inkjet substance transport mode may include a dot mode deposition in which the inkjet ink is jetted in a form of inkjet droplets so that the inkjet layer is formed into a dot-like pattern, and a line mode deposition in which the inkjet ink is continuously jetted so that the inkjet layer is formed into a line pattern, wherein the line mode deposition may be set when the size of the inkjet nozzle is greater or the cycle of jetting the inkjet is shorter than in the dot mode deposition.

The inkjet layer may be a micro-porous layer (MPL) formed on a surface of gas diffusion layer (GDL).

The micro-porous layer may be provided as a monolithic structure or a porous graded structure, depending on the adjustments of the inkjet substance transport mode.

One or more inkjet layers may be formed, and the one or more inkjet layers may be continuously formed by a roll-to-roll manner.

In one embodiment, a production method of a laminar structure for inclusion in a membrane-electrode assembly (MEA) of a polymer electrolyte membrane fuel cell (PEMFC) is provided, which may include forming an electrosprayed layer by lamination of an electrospraying ink, which is electrically charged in electric field, in an electrospraying process in which the electrospraying ink is dispersed and sprayed as electrospraying droplets, wherein the electrospraying process may set an electrospraying substance transport mode according to adjustments of electrospraying process variables.

The production method may additionally include a step of forming an inkjet layer by lamination of an inkjet ink in an inkjet printing process in which the inkjet ink is jetted out of an inkjet nozzle, in which the inkjet printing process may set an inkjet substance transport mode according to adjustments of inkjet process variables.

The electrosprayed layer may be a micro-porous layer formed on a surface of a gas diffusion layer, and the step of forming the electrosprayed layer may include a step of forming the micro-porous layer into a monolithic structure or a porous graded structure, according to adjustments of the electrospraying substance transport mode.

The step of forming the electrosprayed layer may continuously form one or more electrosprayed layers by a roll-to-roll manner.

The electrosprayed layer and the inkjet layer may be micro-porous layers formed on a surface of a gas diffusion layer, and the step of forming the electrosprayed layer and the step of forming the inkjet layer may each include a step of forming the micro-porous layer into a monolithic structure or a porous graded structure according to adjustments of the electrospraying substance transport mode.

The step of forming the electrosprayed layer and the step of forming the inkjet layer may continuously form one or more electrosprayed layers and one or more inkjet layers by a roll-to-roll manner.

In one embodiment, a production method of a laminar structure for inclusion in a membrane-electrode assembly (MEA) of a polymer electrolyte membrane fuel cell (PEMFC) is provided, which may include a step of forming an inkjet layer by lamination of an inkjet ink in an inkjet printing process in which the inkjet ink is jetted out of an inkjet nozzle, in which the inkjet printing process may set an inkjet substance transport mode according to adjustments of inkjet process variables.

The inkjet layer may be a micro-porous layer formed on a surface of a gas diffusion layer, and the step of forming the inkjet layer may include a step of forming the micro-porous layer into a monolithic structure or a porous graded structure according to adjustments of the electrospraying substance transport mode.

The step of forming the inkjet layer may continuously form on or more inkjet layers by a roll-to-roll manner.

Advantageous Effects

According to various embodiments, with electrospraying process and/or inkjet printing process, optimal substance transport route is formed and three-dimensional structure control is enabled. As a result, a laminar structure for inclusion in a micro-porous layer, an electrode layer or the like of a membrane-electrode assembly for a fuel cell can be provided, with both economic and durability advantages.

Further, by the optimal substance transport route and the three-dimensional structure control, content control of a catalyst such as platinum becomes easier, and because the electrochemical reactive surface of the catalyst is maximized, the catalyst stability is increased.

Further, by applying various combinations of the electrospraying process and/or inkjet printing process to a roll-to-roll manner or arrangement process, a mass production technology which can ensure uniformity of performance can be provided.

BEST MODE

The present invention will be explained below with reference to embodiments and drawings.

According to an embodiment, a laminar structure may be included in a membrane-electrode assembly (MEA) of PEMFC.

or the manufacturing process of the MEA for PEMFC, increasing demands include: (1) a demand for process technique to manufacture high functional catalytic electrode layer with increased catalyst stability byway of maximizing electrochemical reaction surface area of the catalyst and easily controlling catalyst content; (2) a demand for structure controlling technique to freely set optimal substance transmission route; and (3) a demand for production technique with high economic and reliability aspects which ensures microstructure homogeneity, performance uniformity and mass-productivity.

That is, in one embodiment, the laminar structure may be implemented as a high functional catalytic electrode layer with optimal substance transport route which is three-dimensionally controllable, or a micro-porous layer having monolithic microstructure, which thus may be mass-producible stably and economically. For example, the laminar structure may be micro-porous layer (MPL) formed on a surface of a gas diffusion layer (GDL), or catalytic electrode layers formed on both sides of the polymer electrolytic membrane.

Further, depending on elemental technology employed to produce MEA, the laminar structure may be implemented as a laminar structure according to a first embodiment which incorporates therein an electrosprayed layer according to electrospraying technology, or a laminar structure according to a second embodiment which incorporates therein an inkjet layer according to inkjet printing technology.

The electrosprayed layer and the inkjet layer may be independently applied to the laminar structure, respectively, or may be combined with each other (according to a third embodiment) to better meet the demands for MEA productivity and size. For example, a laminar structure according to an embodiment may include one or more electrosprayed layers and one or more inkjet layers, which may be mixedly layered in various orders.

First Embodiment

Electrosprayed Layer

First, the laminar structure according to the first embodiment (hereinafter, 'first laminar structure') will be explained below. The first laminar structure includes an electrosprayed layer which may be applied to a micro-porous layer (MPL), or catalytic electrode layer according to various embodiments which will be explained below.

Figure 1:
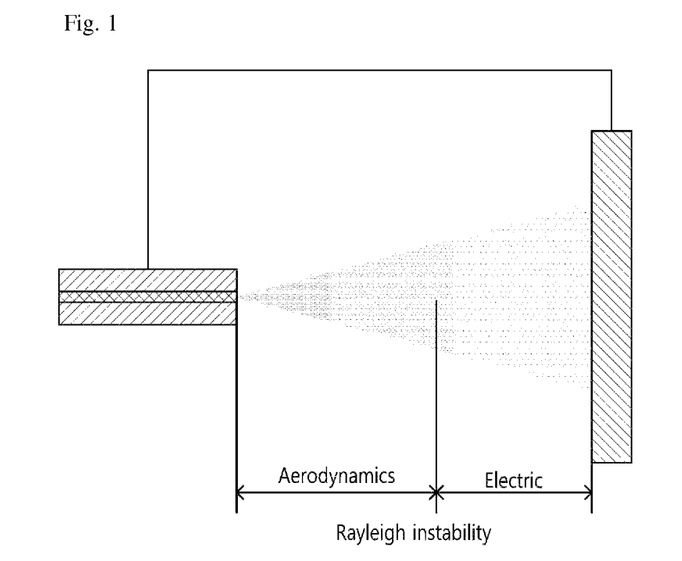
FIG. 1 is a schematic conceptual view of a device for electrospraying purpose.
Figure 2:
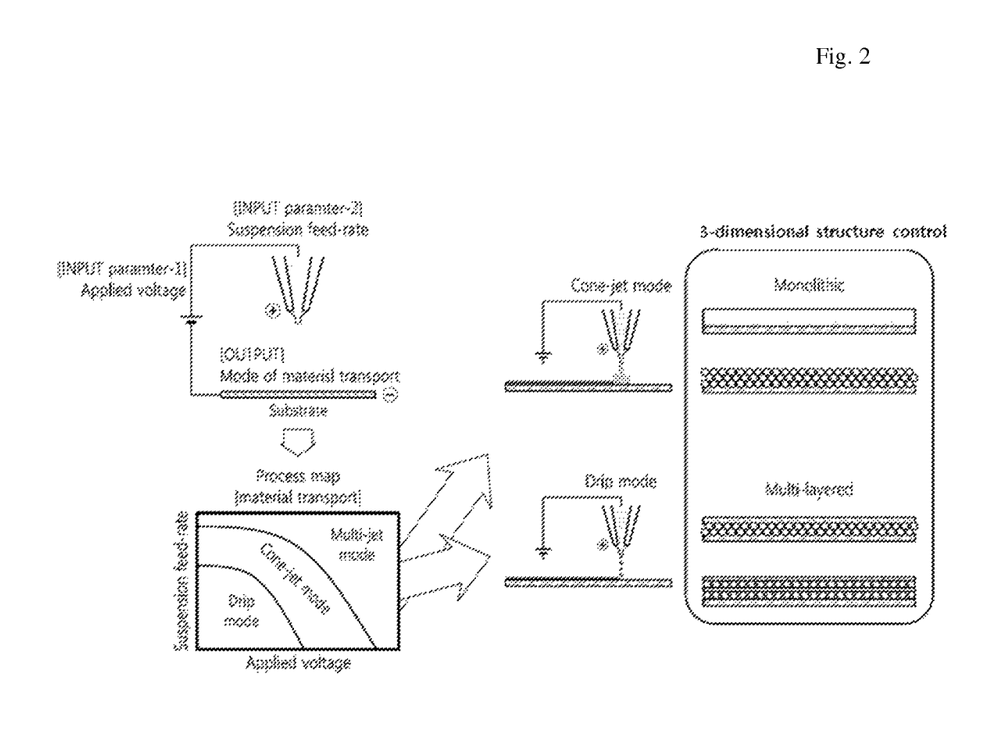
FIG. 2 is a conceptual view provided to explain a process of forming laminar structure with electrospraying process, according to a variety of embodiments.

FIG. 1 is a schematic conceptual view of a device for electrospraying purpose, and FIG. 2 is a conceptual view provided to explain a process of forming laminar structure with electrospraying process, according to a variety of embodiments.

The first laminar structure includes an electrosprayed layer which is formed by electrospraying process.

The electrospraying technique for the purpose of electrospraying process is distinct from general spraying technology, in view of the fact that it utilizes interaction between charged liquid medium and electric field for the purpose of spraying, while the general spraying utilizes gas pressure. Referring to FIG. 1, liquid phase has polarity due to external electric field and liquid flow also occurs due to the electric field. The liquid flow is subject to influence of geometrical shape and flow characteristic of an electrospraying nozzle (or emitter), and has tendency to disperse into fine droplets (i.e., liquid particles) according to the Rayleigh instability. Generally, unit droplet has reduced volume as the solvent evaporates during the flight of the droplet, and subsequently, the charge density inside the unit droplet increases. As a result, secondary liquid phase separation can occur.

That is, with the electrospraying process, the droplet size can be freely controlled within a range of several dozen nm-several dozen um, and the size distribution of the formed droplets can advantageously be uniform. Further, the charge characteristic of the droplets which has repulsive force therebetween during process, provides advantageous effect for the particle dispersion. Further, since it is possible to control flight behavior of the charge particles within the electric field, compared to the conventional mechanical ways, the deposition efficiency increases. Accordingly, the process efficiency is increased particularly when high-price raw material is used as in the case of the present invention, since it is possible to reduce loss during process.

Accordingly, by forming an electrosprayed layer with the electrospraying process which utilizes electrospraying technology, the first laminar structure for inclusion in the MEA of the PEMFC is prepared.

First, the first laminar structure may include an electrosprayed layer which is formed by lamination of an inkjet ink, which is electrically charged in electric field, in an electrospraying process in which the electrospraying ink is dispersed as droplets for electrospraying and sprayed. With the electrospraying process which utilizes the liquid phase with electric charges, the electrosprayed layer may be formed as a catalytic electrode layer by three-dimensionally controlling the Pt content to form the catalytic electrode layer, or as a micro-porous layer by three-dimensionally controlling the microstructure.

Further, the electrospraying process may set electrospraying substance transport mode, according to adjustment of electrospraying variables.

Referring to the conceptual view of FIG. 2 (left-upper side) and to the graph of FIG. 2 (left-lower side), the electrospraying process variables may include feed-rate of electrospraying ink, and strength of the applied voltage to form electric field.

Referring also to the graph of FIG. 2 (left-lower side) and to the conceptual view of FIG. 2 (center), the electrospraying substance transport mode may include a drop mode (or drip mode) according to which electrosprayed layer is formed in dot-like pattern, and a jetting mode (or cone-jet mode) according to which the thickness of the electrosprayed layer and the pore structure of the electrosprayed layer are controlled.

That is, depending on the flow-rate of the ink or the strength of the applied voltage, the substance transport mode of the substance to be jetted through a single nozzle or multiple nozzles may be divided into the drop mode or the jetting mode. The drop mode may drop relatively larger-sized droplets of electrospraying ink compared to the jetting mode (see conceptual view of drop mode in the lower side of center of FIG. 2), and the jetting mode may disperse the electrospraying ink into smaller-sized droplets by increasing the strength of the applied voltage and/or flow-rate and spraying the same (see conceptual view of the cone-jet mode in the upper side of center of FIG. 2).

Referring to the graph of FIG. 2 (left-lower side), the drop mode may be set when the flow-rate of feeding electrospraying ink or the strength of the applied voltage is relatively smaller, while the jetting mode may be set when the flow-rate of feeding electrospraying ink or the strength of the applied voltage is relatively greater than in the drop mode. However, since the above two modes are explained schematically for the purpose of illustration, the electrospraying substance transport mode is not limited to any specific mode only. For example, referring to the graph of FIG. 2 (left-lower side), the mode may be set to jetting mode even when the applied voltage is somewhat low, as far as the flow-rate of feeding the electrospraying ink is high. Likewise, the mode may be set to the jetting mode even when the flow-rate of feeding electrospraying ink is somewhat slow, as far as the strength of the applied voltage is high enough.

The drop mode may be implemented to adjust the size of electrospraying droplets, electrospraying droplet jetting speed, or the speed of the electrospraying nozzle to spray the electrospraying droplets. Accordingly, by the electrospraying process implemented in the drop mode, a variety of dot-shaped patterns may be formed according to the adjustments of the variables explained above, and as a result, the electrosprayed layer may be formed.

The jetting mode may be implemented to adjust the electrospraying droplet output, electrospraying droplet jetting speed, electrospraying droplet viscosity and composition, and speed and path of travel of the electrospraying nozzle. The path of travel of the electrospraying nozzle may include repeating path. By the electrospraying process implemented in the jetting mode, the electrosprayed layer may be formed to a variety of thicknesses based on adjustments of the frequency the repeating path repeats, and the porous structure of the electrosprayed layer can be controlled by way of adjusting the variables explained above.

The first laminar structure may include one or more electrosprayed layers formed in the drop mode, or one or more electrosprayed layers formed in the jetting mode, or all of the one or more electrosprayed layers formed in the drop mode and the one or more electrosprayed layers formed in the jetting mode. That is, the first laminar structure may include a variety of electrosprayed layer formed in drop and jetting modes, in various orders to form a desired structure.

The first laminar structure may also include one or more electrosprayed layers. The one or more electrosprayed layers may be continuously formed by a roll-to-roll manner. The roll-to-roll or arrangement process of the first laminar structure may be implemented so that the electrospraying nozzle in multi-nozzle form forms one arrangement, and each of the arrangement has multi-layered arrangement.

Example 1-1

Micro-Porous Layer

The electrosprayed layer formed by the electrospraying process as explained above may be implemented as a micro-porous layer (MPL) formed on a surface of a gas diffusion layer (GDL). Accordingly, the technical aspects explained above regarding the electrosprayed layer are commonly applicable for the micro-porous layer too. The micro-porous layer may be provided as a monolithic structure or porous graded structure depending on the adjustment of the electrospraying substance transport mode.

Referring to the conceptual view of FIG. 2 (right-upper side), the micro-porous layer may be formed as a monolithic structure. For example, when the electrospraying substance transport mode is the jetting mode, the micro-porous layer may be formed in a manner illustrated in the first view of the monolithic structure of FIG. 2 (right-upper side) in which small droplets repeatedly laminate on the same path, or when the electrospraying substance transport mode is the drop mode, the micro-porous layer may be formed in a manner illustrated in the second view of the monolithic structure of FIG. 2, in which dot-shaped patterns are laminated.

Referring also to the conceptual view of FIG. 2 (right-lower side), the micro-porous layer may be formed as a multi-layered structure in which pores are formed with various gradients. For example, referring to the first view of the multi-layered structure of FIG. 2, after several laminations in the drop mode, additional lamination may follow in the jetting mode. Alternatively, referring to the second view of the multi-layered structure of FIG. 2, the lamination may be performed in a mode that combines the drop and jetting modes together. As a result, a micro-porous layer with desired graded structure may be formed by a combination of the modes.

Example 1-2

Catalytic Electrode Layer

The electrosprayed layer formed by the electrospraying process explained above may also be used as a catalytic electrode layer. Accordingly, the technical aspects explained above regarding the electrosprayed layer are commonly applicable for the catalytic electrode layer too. The electrospraying ink for use in the electrospraying process may be a kind of ink which is formed from catalytic material and ion conductive polymer and solvent. Further, the catalytic material may include Pt catalyst.

Figure 3:
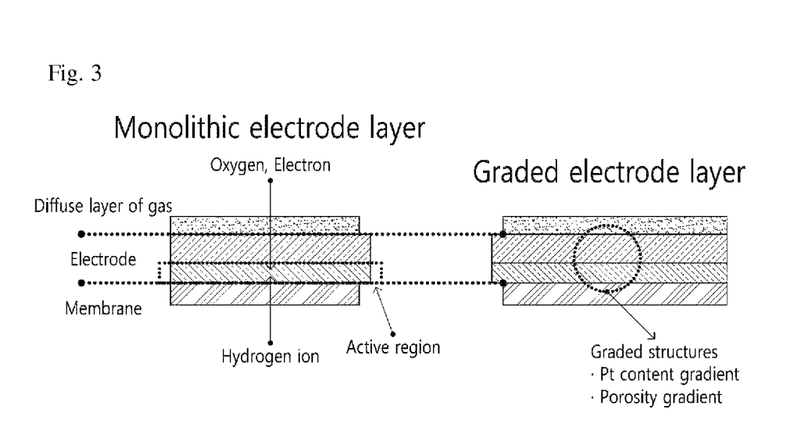
FIG. 3 is a schematic, cross-section view provided to explain a state in which a catalytic electrode layer of the laminar structure is formed by electrospraying process, according to a variety of embodiments.

FIG. 3 is a schematic, cross-section view provided to explain a state in which a catalytic electrode layer of the laminar structure is formed by electrospraying process, according to a variety of embodiments.

Referring to the cross-section view of FIG. 3 (left-hand side), the catalytic electrode layer may include monolithic electrode layer in which Pt catalyst is homogenously distributed by coating, or the like.

The 'graded structure' herein may refer to a structure in which the catalytic electrode layer is laminated into multiple layers by spraying electrospraying ink along the thickness direction of the catalytic electrode layer so that the Pt catalyst content in the catalyst is adjusted.

The graded structure may be so formed that the electrospraying droplets are laminated into multiple layers without adjusting Pt catalyst content in the catalyst, but by spraying the electrospraying ink so that the weight ratio of the catalyst to the electrospraying ink is adjusted along the thickness direction of the catalytic electrode layer.

That is, the graded structure to form the catalytic electrode layer may be formed by adjusting Pt catalyst content in catalyst material and spraying into multiple structures, or by adjusting the weight ratio of the catalyst material with the same Pt content.

The catalytic electrode layer may be formed on the surface of the gas diffusion layer, micro-porous layer, or polymer electrolytic membrane with Catalyst Coated on GDL (CCG) or Catalyst Coated on Membrane (CCM).

Second Embodiment

Inkjet Layer

Next, the laminar structure (Hereinbelow 'second laminar structure') according to the second embodiment will be explained in detail. The second laminar structure may refer to the laminar structure incorporating therein an inkjet layer, in which the inkjet layer may be used for the micro-porous layer (MPL), or the catalytic electrode layer as in the case of the electrosprayed layer according to various embodiments. Throughout the description, the like or similar technical issues or constitution to those explained above will be briefly mentioned or not explained, but referred to the description provided above for the sake of brevity.

Figure 4:
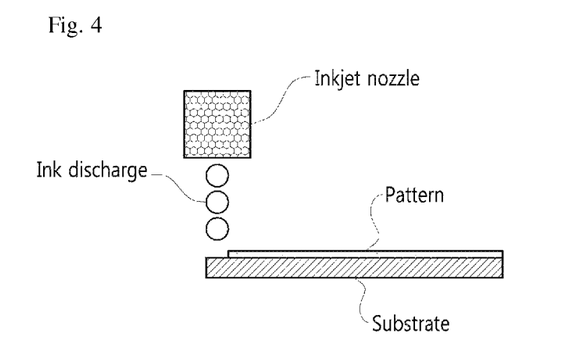
FIG. 4 is a conceptual view provided to explain an inkjet printing process.
Figure 5:
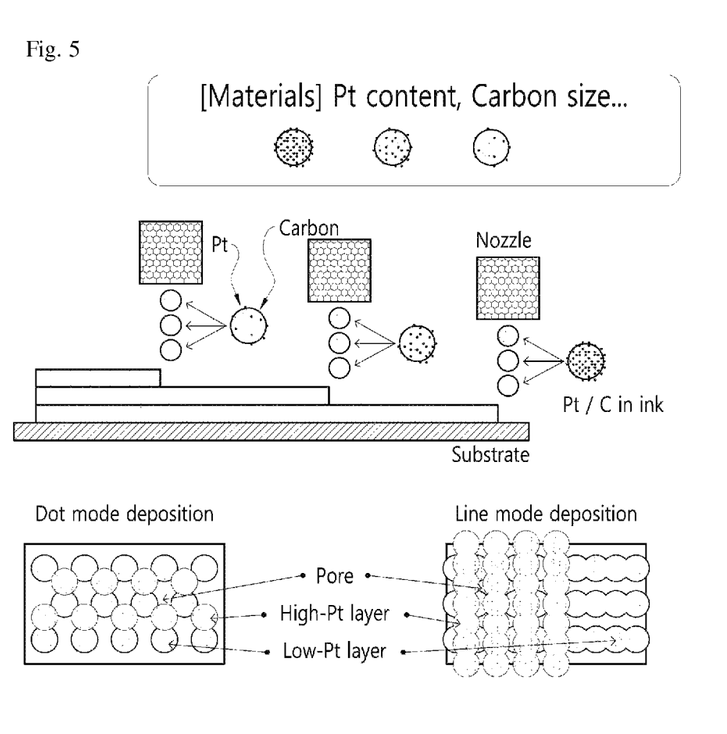
FIG. 5 is a conceptual view provided to explain a catalytic electrode layer in which Pt catalyst is formed as a graded structure by inkjet printing process.

FIG. 4 is a conceptual view provided to explain an inkjet printing process, and FIG. 5 is a conceptual view provided to explain a catalytic electrode layer in which Pt catalyst is formed as a graded structure by inkjet printing process.

The second laminar structure may include an inkjet layer which is formed by the inkjet printing process.

While the electrospraying technology mainly involves plane lamination, the inkjet printing technology for the inkjet printing process uniquely enables efficient dot lamination. That is, inkjet printing technology can handle dot lamination at desired locations to thus form two-dimensional or three-dimensional structure. Although the inkjet jetting may vary depending on the driving principle of the inkjet head, this may be mainly categorized into thermal and pressure manners. Like the electrospraying process, the inkjet printing process, when implemented to form the second laminar structure for inclusion in MEA, can advantageously provide technical effectiveness because it can minimize loss of material in the field that handles high-price raw material such as Pt, and also provide good productivity due to continuous production ability.

Accordingly, the second laminar structure may be prepared for inclusion in the MEA of PEMFC, as the inkjet layer is formed by the inkjet printing process using the inkjet printing technology.

That is, the second laminar structure includes an inkjet layer which is formed by lamination of the inkjet ink in the inkjet printing process in which the inkjet ink is jetted out of the inkjet nozzle. Further, the inkjet printing process may set the inkjet substance transport mode according to the adjustment of the inkjet process variables. For reference, the inkjet printing process may employ thermal jet manner and piezo manner.

The inkjet process variables may include a size of inkjet nozzle, and a cycle of jetting inkjet ink. Further, referring to FIG. 5, inkjet substance transport mode may include a dot mode deposition in which the inkjet ink is jetted as inkjet droplets to form dot-like pattern of inkjet layer (see conceptual view of left, lower side of FIG. 5), and a line mode deposition (see conceptual view of right, lower side of FIG. 5) in which the inkjet ink is continuously jetted to form a line-type pattern of inkjet layer. Both the dot mode deposition and the line mode deposition may be controlled by adjusting the size of the inkjet nozzle to jet out the inkjet ink and cycle of jetting out the inkjet ink.

That is, the transport mode of the substance jet out through a single nozzle or multi nozzles may be set to dot mode deposition, or line mode deposition depending on the size of the inkjet nozzle and cycle of jetting out inkjet ink. The dot mode deposition may drop the inkjet ink according to slower jetting cycle than the line mode deposition (see conceptual view of dot mode deposition in the left, lower side of FIG. 5), while the line mode deposition may shorten the jet cycle or increase the nozzle size to drop the inkjet ink with faster cycle (see conceptual view of line mode deposition in the right, lower side of FIG. 5).

Overall, the dot mode deposition may be set when the inkjet nozzle size is small or when the cycle of inkjet ink jetting is long, and the line mode deposition may be set when the inkjet nozzle size is large or when the cycle of inkjet ink jetting is short. However, the above explanation is given only for the purpose of schematic illustration of a concept that two modes are selectable, and the inkjet substance transport mode is not limited to any of the specific examples given above. Accordingly, the line mode deposition may be set even when the inkjet nozzle size is small, as far as the inkjet ink jetting cycle is short.

Further, the dot mode deposition may be implemented to adjust the inkjet droplet size, the inkjet droplet jetting speed, or the speed of the inkjet nozzle to spray the inkjet droplets. Accordingly, by the inkjet printing process in dot mode deposition, a variety of dot-shaped patterns may be formed according to adjustments of the variables explained above, and the inkjet layer may be formed therefrom. Further, referring to the conceptual view on the lower side of FIG. 5, it is possible to control the pore structure of the inkjet layer which is formed in accordance with the adjustments of the variables.

The line mode deposition may be implemented to adjust the inkjet ink jetting speed, inkjet ink viscosity and composition, and speed of inkjet nozzle and also to adjust the path of travel of the inkjet nozzle to linear constitution. The path of travel of the inkjet nozzle may include repeating path. By the inkjet printing process in the line mode deposition, and according to adjustments of the repeating frequency of the repeating path, an inkjet layer of a variety of thicknesses may be formed, in which the pore structure of the inkjet layer is controlled in accordance with the adjustments of the variables (see conceptual view, lower side of FIG. 5).

Further, the second laminar structure may include one or more inkjet layers formed in the dot mode deposition, or one or more inkjet layers formed in the line mode deposition, or all of the one or more inkjet layers formed in the dot mode deposition, and one or more inkjet layers formed in the line mode deposition. That is, the second laminar structure may be formed to a desired structure by laminating a plurality of inkjet layers formed in the dot mode deposition or the line mode deposition in various orders.

Example 2-1

Micro-Porous Layer

The inkjet layer formed in the inkjet printing process explained above may be used for the micro-porous layer (MPL) formed on a surface of gas diffusion layer (GDL). Accordingly, the technical characteristics explained above regarding the inkjet layer can be commonly applied for the micro-porous layer too. The micro-porous layer may be formed as monolithic structure or porous graded structure, according to adjustment of the inkjet substance transport mode.

Although not illustrated in the drawings, the micro-porous layer may be formed as a monolithic structure. For example, when the inkjet substance transport mode is line mode deposition, the inkjet ink is continuously jetted out to form a line-type pattern of inkjet layer. As a result, the micro-porous layer of monolithic structure is formed. Further, when the inkjet substance transport mode is the dot mode deposition, the inkjet ink may be jetted out as the inkjet droplets to be laminated as dot-shaped pattern. As a result, the micro-porous layer of monolithic structure is formed.

Further, the micro-porous layer may be formed as a multi-graded structure having pores with multiple gradients. For example, after several times of lamination in the dot mode deposition, the lamination in line mode deposition may follow. Alternatively, the lamination may be performed with repeating the dot mode deposition and the line mode deposition. Accordingly, the micro-porous layer with desired graded structure may be formed based on a combination of the modes explained above.

Example 2-2

Catalytic Electrode Layer

The inkjet layer formed by the inkjet printing process explained above may be used for the catalytic electrode layer. That is, the technical characteristics of the inkjet layer explained above may be commonly applied to the catalytic electrode layer too. The inkjet ink for the inkjet printing process may be a type of ink which is formed from catalyst material, ion conductive polymer and solvent. Further, the catalyst material may include Pt catalyst.

Although not illustrated in the drawings, the catalytic electrode layer may include monolithic electrode layer in which Pt catalyst is homogeneously distributed, by coating, or the like.

Referring also to FIG. 5, the catalytic electrode layer may include graded electrode layer in which Pt catalyst is formed into graded structure.

The 'graded structure' herein may refer to a structure in which the catalytic electrode layer is laminated into multiple layers by spraying electrospraying ink along the thickness direction of the catalytic electrode layer so that the Pt catalyst content in the catalyst is adjusted.

For example, referring to the conceptual view, upper side of FIG. 5, the catalytic electrode layer is formed into multi-layer structure having graded contents including a layer of high Pt/C content, a layer of intermediate Pt/C content, and a layer of low Pt/C content.

The graded structure may be formed by spraying electrospraying ink into multi-layers of electrospraying droplets, which have constant Pt catalyst content in the catalyst material, but adjusted weight ratio of the catalyst material to the electrospraying ink along the thickness direction of the catalytic electrode layer.

Referring to the conceptual view, lower side of FIG. 5, the catalytic electrode layer as formed includes a low-Pt layer which has low Pt catalyst to the electrospraying ink, and a high-Pt layer which has high Pt content in the electrospraying ink, in order. As explained above, the Pt catalyst content in the electrospraying ink may be adjusted, or alternatively, may be kept constant, while the weight ratio of the catalyst material including Pt catalyst to the electrospraying ink is adjusted.

That is, the graded structure of the catalytic electrode layer may include a graded structure which is formed by adjusting Pt catalyst content in the catalyst material and spraying the same into multi-layer structure, and a graded structure which is formed by adjusting weight ratio of catalyst material with constant Pt catalyst content.

Further, the catalytic electrode layer may be formed on a surface of gas diffusion layer, micro-porous layer, or polymer electrolytic membrane by Catalyst Coated on GDL (CCG) or Catalyst Coated on Membrane (CCM).

The second laminar structure may include one or more inkjet layers. Further, the one or more inkjet layers may be continuously formed in a roll-to-roll manner. The technical characteristic of the roll-to-roll manner or the arrangement of the second laminar structure may include the fact that the inkjet nozzle is formed in a form of multi-nozzle into one arrangement, and each arrangement has multi-layered arrangement.

Third Embodiment

Electrosprayed Layer and Inkjet Layer

Next, the laminar structure (hereinbelow, 'third laminar structure') according to a third embodiment will be explained below. The third laminar structure may be implemented as a laminar structure including an electrosprayed layer and an inkjet layer, and like the other embodiments, the third laminar structure may be used for micro-porous layer (MPL), or catalytic electrode layer. Throughout the description, the like or similar technical issues or constitution to those explained above will be briefly mentioned or not explained, but referred to the description provided above for the sake of brevity.

The third laminar structure may include an electrosprayed layer which is formed by the electrospraying process in which electrospraying ink, which is electrically charged in electric field, is dispersed into electrospraying droplets and sprayed and laminated, and an inkjet layer which is formed by inkjet printing process of jetting out inkjet ink through the inkjet nozzle into laminated structure.

Further, the electrospraying process may set electrospraying substance transport mode according to the adjustments of the electrospraying process variables, and the ink printing process may set the inkjet substance transport mode according to the adjustments of the inkjet process variables.

The electrosprayed layer and the inkjet layer may be micro-porous layer (MPL) formed on the surface of gas diffusion layer (GDL). The micro-porous layer may be formed as monolithic structure or porous graded structure according to one or more adjustments of the electrospraying substance transport mode, and the inkjet substance transport mode. That is, the electrosprayed layer may be formed as monolithic structure or graded structure based on the adjustments of the electrospraying substance transport mode, and the inkjet layer may be formed as monolithic structure or the graded structure based on the adjustments of the inkjet substance transport mode, and the third laminar structure may be formed as the electrosprayed layer and the inkjet layer formed as above are combined.

Further, the electrosprayed layer and the inkjet layer may be catalytic electrode layers. The electrospraying ink and the inkjet ink may be a kind of ink that is formed from catalyst material, ion conductive polymer and solvent. The catalyst material may contain Pt catalyst. The catalytic electrode layer may include monolithic layer in which Pt catalyst is homogeneously distributed, or graded layer in which Pt catalyst is formed into gradients.

The 'graded structure' herein may refer to a structure in which the catalytic electrode layer is laminated into multiple layers by spraying electrospraying ink or jet out the inkjet ink along the thickness direction of the catalytic electrode layer so that the Pt catalyst content in the catalyst is adjusted. That is, it is possible to form the electrosprayed layer by spraying electrospraying ink in which the Pt catalyst content in the catalyst material is adjusted along the thickness direction of the catalytic electrode layer, and form the inkjet layer by jetting out the inkjet ink in which the Pt catalyst content in the catalyst material is adjusted along the thickness direction of the catalytic electrode layer. Accordingly, the graded structure of the catalytic electrode layer may be formed by combining the electrosprayed layer and the inkjet layer prepared as explained above.

The graded structure may also be formed by spraying the electrospraying ink in which the weight ratio of the catalyst material to the electrospraying ink is adjusted along the thickness direction of the catalytic electrode layer, while maintaining the Pt catalyst content in the catalyst material as is, so that the electrospraying droplets are laminated into multiple layers. Further, the inkjet layer may be formed into graded, multi-layer structure by jetting out the inkjet ink in which the weight ratio of the catalyst material in the inkjet ink is adjusted along the thickness direction of the catalytic electrode layer so that the inkjet droplets are laminated into multiple layers.

The catalytic electrode layer may be formed on the surface of the gas diffusion layer, micro-porous layer, or polymer electrolytic membrane by CCG or CCM.

The third laminar structure may include one or more electrosprayed layers, and one or more inkjet layers. That is, the third laminar structure may be formed by laminating a desired number of electrosprayed layers and a desired number of inkjet layers in a desired order. Further, the one or more electrosprayed layers and the one or more inkjet layers may be provided in different structures. The 'different structure' as used herein may include monolithic structure versus graded structure, and more than that, such as, the monolithic structure containing different catalyst material amounts, graded structure including different gradients of catalyst material contents, or many others.

Figure 6:
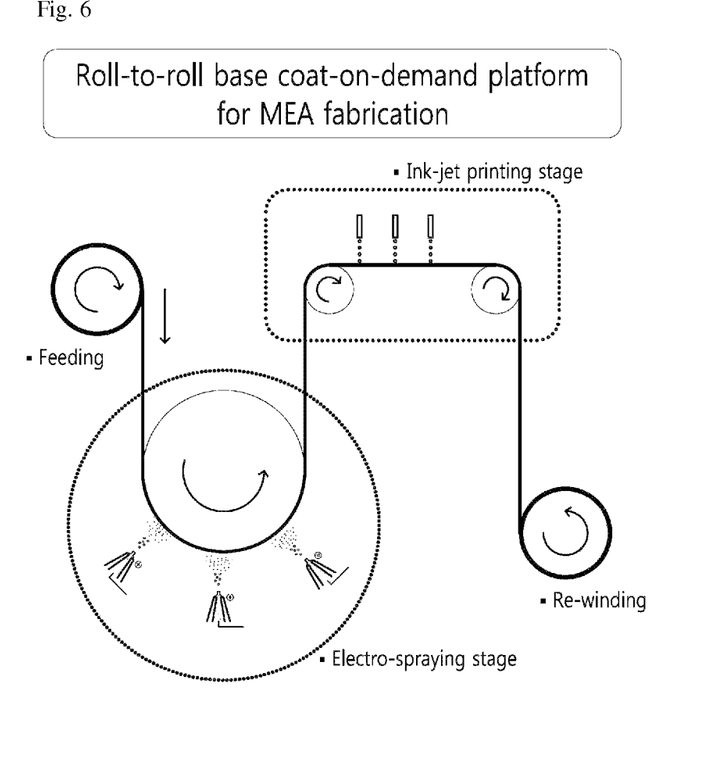
FIG. 6 is a conceptual view of a manufacturing method of a laminar structure according to roll-to-roll manner.

FIG. 6 is a conceptual view of a manufacturing method of a laminar structure according to roll-to-roll manner.

Referring to FIG. 6, the one or more electrosprayed layers and the one or more inkjet layers may be continuously formed by roll-to-roll manner. Referring to FIG. 6, the technical characteristic of the roll-to-roll manner or the arrangement of the third laminar structure may include the fact that the electrospraying nozzle in a multi-nozzle form is formed into one arrangement, and each arrangement has multi-layer structure. Accordingly, by applying various combinations of the electrospraying process and/or inkjet printing process for the roll-to-roll manner or the arrangement process, mass-production technology that ensures performance uniformity can be provided.

Further, according to the present invention, with the optimal substance transport route formed and three dimensional structural control, which are enabled by the electrospraying process and/or inkjet printing process, economic and durability aspects are ensured in the preparation of laminar structure for use in a micro-porous layer, or electrode layer for membrane-electrode assembly for a fuel cell, or the like. Further, the above-mentioned optimal substance transport route and three-dimensional structure control can also enable easier content control of the catalyst such as Pt, maximize the electrochemical reaction surface area of the catalyst and also increase stability of the catalyst.

Meanwhile, a production method of a laminar structure according to an embodiment will be explained below. Throughout the description, the like or similar technical issues or constitutions to those explained above will be briefly mentioned or not explained, but instead be referred to the description provided above for the sake of brevity.

In one embodiment, a production method of laminar structure may involve production of laminar structure for inclusion in MEA of PEMFC.

In one embodiment, the production method of laminar structure may include a step of forming an electrosprayed layer by lamination of an electrospraying ink, which is electrically charged in electric field, in an electrospraying process in which the electrospraying ink is dispersed and sprayed as electrospraying droplets. The electrospraying process may set electrospraying substance transport mode according to adjustments of the electrospraying process variables. Further, the step of forming electrosprayed layer may form one or more electrosprayed layers.

By way of example, the electrosprayed layer may be a micro-porous layer formed on a surface of gas diffusion layer, and the step of forming the electrosprayed layer may include forming the micro-porous layer into monolithic structure or graded porous structure according to adjustments of the electrospraying substance transport mode.

In another example, the electrosprayed layer may be catalytic electrode layer, and the step of forming the electrosprayed layer may include forming the catalytic electrode layer into monolithic layer in which Pt catalyst is homogeneously distributed. Further, the electrosprayed layer may be catalytic electrode layer, and the step of forming electrosprayed layer may include a step of forming the catalytic electrode layer into graded layer in which Pt catalyst is formed into graded structure.

The step of forming graded layer may include a step of forming graded structure by spraying electrospraying ink in which the Pt catalyst content in the catalyst material is adjusted along the thickness direction of the catalytic electrode layer so that the catalytic electrode layer is laminated into multiple layers.

The step of forming graded layer may also include a step of forming graded structure by spraying the electrospraying ink in which the weight ratio of the catalyst material to the electrospraying ink is adjusted along the thickness direction of the catalytic electrode layer, while maintaining the same Pt catalyst content in the catalyst material, so that the electrospraying droplets are laminated into multiple layers.

Further, the step of forming electrosprayed layer may form one or more electrosprayed layers continuously by roll-to-roll manner. For reference, the one or more electrosprayed layers may be formed by the arrangement process, instead of the roll-to-roll manner.

In another embodiment, a production method of laminar structure may include a step of forming an inkjet layer by lamination of inkjet ink in an inkjet printing process in which the inkjet ink is jetted out of inkjet nozzle. The inkjet printing process may set inkjet substance transport mode according to adjustments of the inkjet process variables. Further, the step of forming inkjet layer may form one or more inkjet layers.

By way of example, the inkjet layer may be a micro-porous layer formed on a surface of gas diffusion layer, and the step of forming the inkjet layer may include a step of forming the micro-porous layer into a monolithic structure or porous graded structure by the adjustments of the electrospraying substance transport mode.

In another example, the inkjet layer may be catalytic electrode layer, and the step of forming the inkjet layer may include a step of forming the catalytic electrode layer into monolithic layer in which Pt catalyst is homogeneously distributed. Further, the inkjet layer may be catalytic electrode layer, and the step of forming the inkjet layer may include a step of forming the catalytic electrode layer into graded layer in which Pt catalyst is formed into graded structure.

The step of forming graded layer may include a step of forming the graded structure by spraying the electrospraying ink in which the Pt catalyst content in the catalyst material is adjusted along the thickness direction of the catalytic electrode layer so that the catalytic electrode layer is laminated into multiple layers.

Alternatively, the step of forming graded layer may include a step of forming the graded structure by spraying the electrospraying ink in which the weight ratio of the catalyst material to the electrospraying ink is adjusted along the thickness direction of the catalytic electrode layer, while maintaining the same Pt catalyst in the catalyst material, so that the electrospraying droplets are laminated into multiple layers.

The step of forming inkjet layer may form one or more inkjet layers continuously, using roll-to-roll manner. For reference, the one or more inkjet layers may be formed by arrangement process, instead of roll-to-roll manner.

Meanwhile, according to yet another embodiment, a production method of laminar structure may include steps of: forming electrosprayed layer by lamination of an electrospraying ink, which is electrically charged in electric field, in an electrospraying process in which the electrospraying ink is dispersed and sprayed as electrospraying droplets, and forming an inkjet layer by lamination of an inkjet ink in an inkjet printing process in which the inkjet ink is jetted out of the inkjet nozzle.

The step of forming the electrosprayed layer may form one or more electrosprayed layers, and the step of forming the inkjet layer may form one or more inkjet layers. Further, the one or more electrosprayed layers and the one or more inkjet layers may be laminated in an order as desired by a manufacturer.

Further, referring to FIG. 6, the one or more electrosprayed layers and the one or more inkjet layers may be continuously formed by a roll-to-roll manner. As illustrated in FIG. 6, a production method of laminar structure according to another embodiment may have a characteristic based on a system in which both inkjet nozzle and electrospraying nozzle are placed continuously along the flow of material. For reference, the one or more inkjet layers may be formed by the arrangement process, instead of the roll-to-roll manner.

For the explanation of the constitution of the electrosprayed layer, the constitution of the inkjet layer, and the constitution of combination of the electrosprayed layer and the inkjet layer, along with sub-constitutions of the respective constitutions, the roll-to-roll manner to prepare the laminar structure, and their applied embodiments, reference is made to the explanation provided above in various embodiments.

Optimization of Catalytic Electrode Ink for Electrospraying Process

For the synthesis of catalytic electrode using electrospraying process, ink containing catalyst for the purpose of electrochemical reaction, and ionomer as a path of travel of proton is used, and the MEA reactive characteristic is subject to influence of the ink composition. Accordingly, it is necessary to optimize the composition to optimize the electrode characteristic of the catalytic electrode which is synthesized by the electrospraying process.

For the ionomer of the ink for the purpose of catalytic electrode synthesis, nafion is used. Accordingly, with the nafion content ratio varied in a range of 15 wt. %-30 wt. %, the catalytic electrode is directly formed on both surfaces of the membrane using electrospraying. The Pt content within electrode is set to 0.2 mg, and the electrode is prepared to a size 3.5×3.5 cm$^2$.

Figure 7:
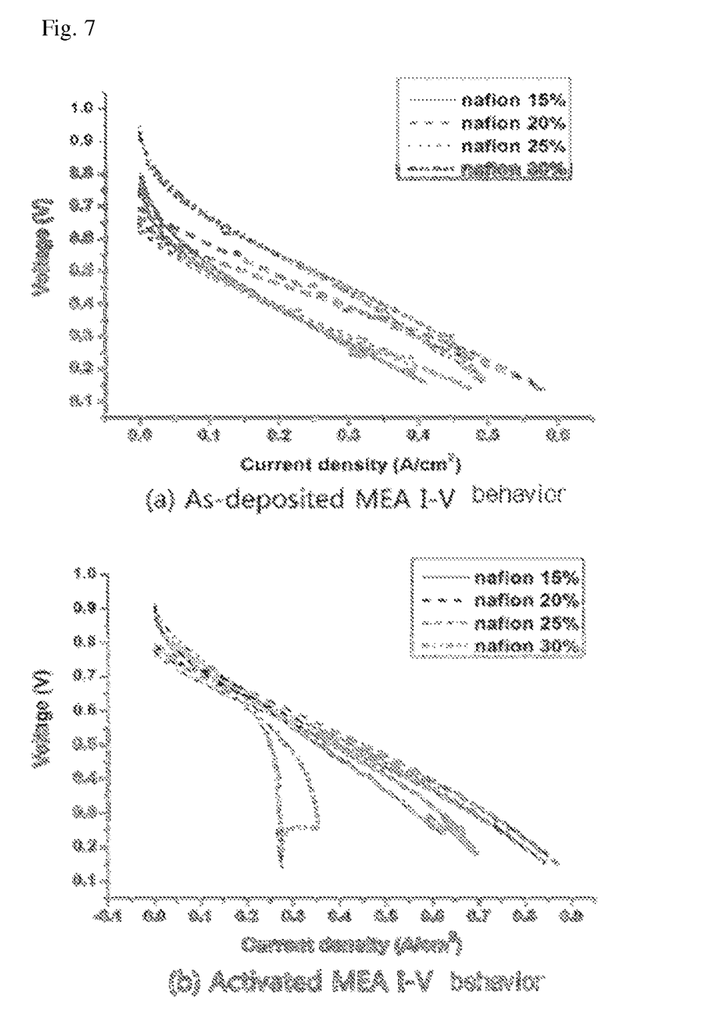
FIG. 7 is a graph expressing I-V behavior according to nafion content of ink for catalytic electrode.

Referring to FIG. 7, I-V characteristic differs depending on variation of ionomer content, in which the I-V behavior evaluation of the electrode after the deposition and activation confirms optimal electrode characteristic when the nafion content is in 20 wt. %-25. wt. % range.

To form the catalytic electrode with the electrospraying process, the catalytic electrode ink may be a type of ink which is a homogenous mixture of carbon particle catalyst in which Pt/C and Pt alloy are dispersed, with ionomer, and the ionomer content ranges between 20 wt. %-25 wt. %.

Electrode Formation Using•Electrospraying Process

The electrospraying process involves spraying catalytic electrode ink, which is catalyst and proton conductor (i.e., ionomer) homogenously dispersed in solvent, inside the electric field, and may be applied as a process technology to laminate the electrode layer directly on the surface of membrane or gas diffusion layer.

The process technology that forms electrode on the surface of membrane using electrospraying process, which is the direct catalyst coated on membrane (CCM) process technology, may have deformation due to hygroscopic expansion of the membrane, and in severest cases, such deformation may be irrecoverable, although certain deformation within a proper plastic deformation range is recoverable after the process.

Accordingly, the technique or system technology to minimize the deformation of the membrane during lamination, is the key to optimized process, and eventually, is the key to the control on liquid fraction of the laminated particles. When the laminated particle has high liquid fraction, the hygroscopic expansion increases. Accordingly, it is preferable to apply such a process technique that can minimize the liquid fraction. The process variables that can influence the liquid fraction may include ink composition, applied voltage, spraying distance, or ink feed rate. The ink for catalytic electrode may have decreased liquid fraction, when catalyst and ionomer are more evenly dispersed in IPA liquid and when the concentration of solid particles is higher. However, higher ink concentration can cause nozzle blockage in the process, and instable formation of electric field. Accordingly, the ink may preferably be synthesized so that the ionomer content against Pt/C is at a composition ratio of 20-25 wt. %, and the IPA liquid with reference to 1 g solute is in a range of 20 ml-40 ml. The applied voltage may be implemented in association with the ink composition, ink feed rate and spray distance, and nozzle and nozzle diameter, and is set to a range that can efficiently form con-jet. The spray distance influences the solvent within solution on its degree of evaporation during flight of the liquid jetted through the nozzle. Accordingly, because the degree of evaporation of the solvent within droplet increases as the distance of flight increases, the liquid fraction of the laminated droplets can be reduced. The flight distance may preferably be in a range of 50 mm-100 mm.

When directly forming electrode on the membrane by using electrospraying process, in order to minimize interfacial resistance with the gas diffusion layer, a multi-layer structure may be used, in which 100 nm of carbon black which does not carry catalyst is coated along with ionomer, and selectively with a PTFE-containing modification layer depending on need, on the surface of gas diffusion layer or electrode. The ionomer content may be in a range of 10 wt. %-15 wt. %, which is intermediate value between the electrode and the gas diffusion layer.

The ink for the electrospraying process is so prepared that the ionomer is mixed at a composition ratio of 20-25 wt. % to the solid additive, and the IPA solution with reference to 1 g solid additive ranges between 20 ml-40 ml, to suppress nozzle blockage at high concentration, or hygroscopic expansion deformation due to high liquid fraction of the liquid droplets at low concentration.

Formation of Multi-Layered Catalytic Electrode

The process technology to synthesize catalystic electrode with the electrospraying process can be mainly divided into technology to form electrode on the membrane surface, and process technology to synthesize catalytic electrode on the surface of gas diffusion layer. At the same time, the multi-layer structure catalytic electrode may be constructed so that, against the MEA cross section, catalyst content, ionomer content and pore content are artificially adjusted, which is possible by way of controlling microstructure by changing ink composition and process variables.

The catalyst content and ionomer content may be varied by way of initial ink composition. For the Pt/C catalyst, catalyst with different Pt loading may be used, according to which it is possible to change Pt catalyst content along thickness direction of the catalytic electrode. The gradient of the Pt content in the catalytic electrode may be so formed that, in the case of oxidation reduction electrode, the Pt content gradually decreases in a direction from the proximity to the membrane surface to the proximity to the gas diffusion layer, in which the electrode is formed by using Pt/C loading 40 wt. % Pt, Pt/C loading 20 wt. % Pt, and Pt catalyst loading 10 wt. % Pt/C. For hydrogen oxidation electrode, the catalytic electrode may have monolithic structure or may be synthesized by way of composition control in opposite direction.

Figure 8:
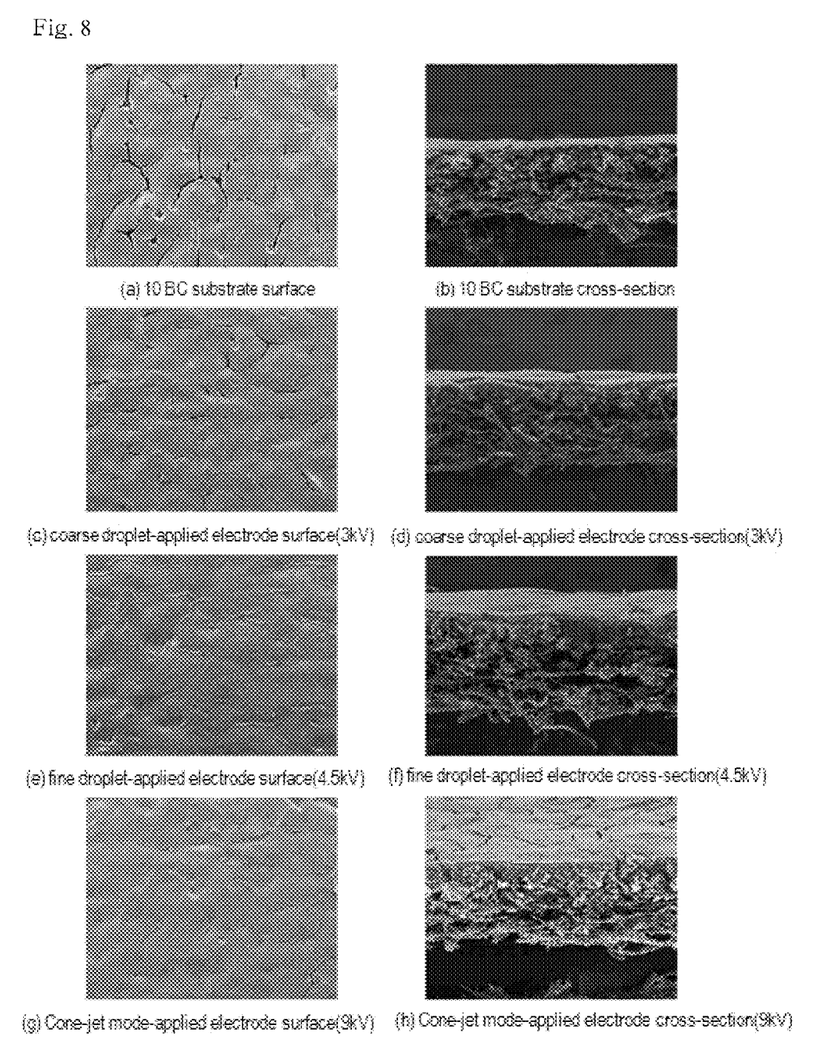
FIG. 8 illustrates microstructure of catalytic electrode directly formed on the surface of gas diffusion layer by the change of material transport mode.

The substrate of the catalytic electrode synthesized by the electrospraying may be divided into a membrane and a gas diffusion layer. When the gas diffusion layer is used as the substrate, in consideration of the process characteristic of the electrospraying and structural characteristic of the gas diffusion layer, a gas diffusion layer (GDL) including microporous layer (MPL) may be used. In order to synthesize catalytic electrode to MPL-GDL, like the case of synthesizing electrode on the membrane surface, monolithic catalytic electrode or multi-layer structure catalytic electrode may be formed. For the monolithic structure, the advantage is that various substance transport modes are applicable thanks to less constrains than the case of membrane in the process for substrate deformation. Indeed, FIG. 8 shows the characteristics of the catalytic electrode which is synthesized by the electrospraying using cone-jetting mode, and inkjet process using drop mode. For basic material, gas diffusion layer having MPL formed therein (Sigracet® 10 BC (SGL)) is used, and for ink, 40 wt. % Pt/C and ionomer are homogenously dispersed in IPA, in which the ionomer composition is set to 23 wt. %. The range of applied voltage is varied between 3 kV, 4.5 kV, and 9 kV, to change the substance transport mode. Accordingly, FIG. 8 shows the fact that the macroscopic microstructure has differences depending on the substance transport mode.

Figure 9:
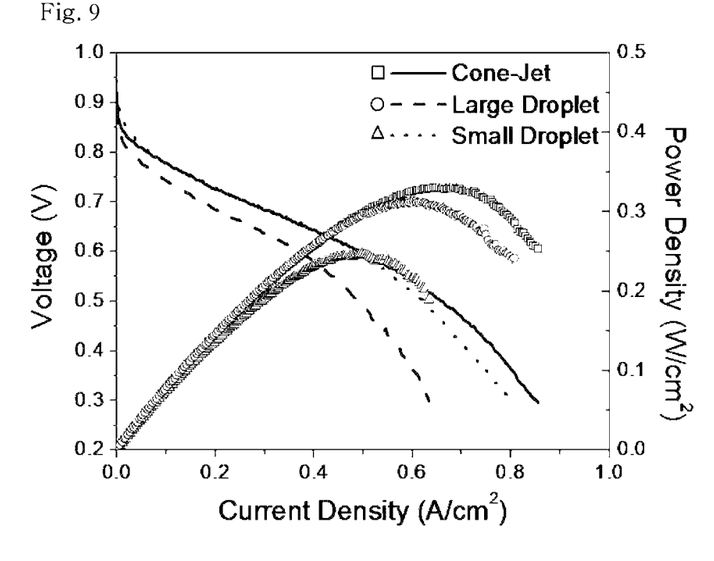
FIG. 9 illustrates I-V behavior of the catalytic electrode formed directly on the surface of gas diffusion layer by the change of material transport mode.

The 5-story MEA is synthesized after cutting the gas diffusion layer on which the electrode catalyst is laminated, and inserting the membrane in the middle, and the I-V characteristic is evaluated as illustrated in FIG. 9. In the coarse drop mode, the liquid ingresses into the gas diffusion layer, thus decreasing the catalyst content in the gas diffusion layer and the electrode, and deteriorating I-V characteristic. On the contrary, when the electrode is formed with fine droplets, the relatively better result is obtained.

The membrane and the electrode have relatively high interfacial resistance therebetween, when the electrode is directly synthesized on the gas diffusion layer and bonded to the membrane. This acts as the major cause of power loss of the MEA, and has to be dealt with by use of hot press process. The hot press process may preferably be performed at 80° C.-150° C., under 1 ton-4 ton of pressure, and for the duration of 1 min-10 min, and above temperature 150° C., the resistance rapidly rises during the process due to dehydration and deformation of the membrane, while under 80° C., the interfacial resistance is relatively high. Additionally, the layered structure of the MEA which is formed by the process technology of synthesizing electrode on the gas diffusion layer and bonding with the membrane, may be the multi-layer structure which has varying Pt content, and at the same time, about 100 nm ionomer may be applied on the surface of the catalytic electrode to enhance interfacial bonding between the membrane and the catalytic electrode.

Regarding durability of the MEA, the MEA breakage may occur when the mechanical stress generates depending on the driving environment. Accordingly, a multi-layer structure may be designed to reinforce mechanical characteristic efficiently, by way of inserting mesh network-type of reinforcement layer using carbon fiber before laminating electrode, or varying carbon and ionomer contents.

By directly synthesizing catalytic electrode on the surface of gas diffusion layer using electrospraying process or inkjet process, controlling the layer structure to have 100 nm-thick ionomer layer on the surface of catalytic electrode and synthesizing MEA using hot press process, double layer structure and hot press process may preferably minimize geometric formation of the interface between the membrane and the catalytic electrode and resistance of proton transport.

Electrospraying Process System Optimization

For the electrospraying process, spraying process using cone jetting mode and inkjet process using drop mode may be applied, depending on the characteristics of the substrate. The electrospraying process provides advantages such as continuous process or arrangement, because it is possible to directly form the electrodes. The continuous process may apply in-line process or roll-to-roll process, depending on the substrate material and process technology as used.

The continuous process particularly requires optimized ink feeder of the system. The ink feeder may include an ink synthesizer, an ink reservoir, and a feeding line, each of which is so configured to allow uniform composition and dispersion. In order to ensure uniform composition and dispersion stability, mechanical agitation and ultrasonic wave dispersion may be applied. The ultrasonic wave dispersion may include a way in which ultrasonic waves are generated on the container wall, or a way in which an ultrasonic wave generator in a rod-like configuration is dipped in solution. The homogenously synthesized ink may be transported to the reservoir for stabilization, and fed to the respective nozzles by micro-pumps along the feeding line.

When the electrode is directly synthesized on the surface of the membrane, it is imperative that the membrane deformation is minimized in the lamination process. To that purpose, a system is required, which can minimize the liquid content during applying of the droplet. Accordingly, a heating apparatus may be provided on a substrate on which the membrane is mounted, or an apparatus to directly heat the membrane itself may be used. The way of directly heating the membrane may include spraying hot air against the surface of the membrane, and using a lamp.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

INDUSTRIAL APPLICABILITY

The invention is applicable for a micro-porous layer, electrode layer or the like for a membrane-electrode assembly for a fuel cell.

The invention claimed is:

1. A laminar structure for inclusion in a membrane-electrode assembly (MEA) of a polymer electrolyte membrane fuel cell (PEMFC), comprising an electrosprayed layer formed by lamination of an electrospraying ink, which is electrically charged in electric field, in an electrospraying process in which the electrospraying ink is dispersed and sprayed as electrospraying droplets, wherein
the electrospraying process sets an electrospraying substance transport mode according to adjustments of electrospraying process variables,
wherein the electrosprayed layer is a micro-porous layer (MPL) formed on a surface of a gas diffusion layer (GDL),
wherein the micro-porous layer is formed as a multi-layered structure which includes:
a first layer with dot-shaped patterns;
a second layer with dot-shaped patterns, which is disposed on and in contact with the first layer; and
a third layer formed by droplets smaller than droplets forming the first and second layers, which is disposed on the second layer,
wherein the first, second and third layers are stacked in a thickness direction of the micro-porous layer.

2. The laminar structure as set forth in claim 1, wherein the electrospraying process variables are a feed rate of feeding the electrospraying ink, and a strength of applied voltage to form the electric field.

3. The laminar structure as set forth in claim 2, wherein the electrospraying substance transport mode comprises a drop mode in which the electrosprayed layer is formed to have the dot-shaped patterns, and
a jetting mode in which thickness of the electrosprayed layer and structure of pores formed in the electrosprayed layer are controlled, wherein
the jetting mode is set when the feed rate of feeding the electrospraying ink is greater, or when the strength of the applied voltage is greater than in the drop mode.

4. The laminar structure as set forth in claim 1, further comprising an inkjet layer which is formed by lamination of an inkjet ink in an inkjet printing process in which the inkjet ink is jetted out of an inkjet nozzle, wherein
the ink printing process sets an inkjet substance transport mode according to adjustments of inkjet process variables.

5. The laminar structure as set forth in claim 4, wherein the inkjet process variables are a size of the inkjet nozzle, and a cycle of jetting the inkjet ink.

6. The laminar structure as set forth in claim 4, wherein the inkjet substance transport mode comprises:
a dot mode deposition in which the inkjet ink is jetted in a form of inkjet droplets so that the inkjet layer is formed into a dot-like pattern, and
a line mode deposition in which the inkjet ink is continuously jetted so that the inkjet layer is formed into a line pattern, wherein
the line mode deposition is set, when a size of the inkjet nozzle is greater, or a cycle of jetting the inkjet is shorter than in the dot mode deposition.

7. The laminar structure as set forth in claim 1, wherein one or more electrosprayed layers are formed, and the one or more electrosprayed layers are continuously formed by a roll-to-roll manner.

8. The laminar structure as set forth in claim 4, wherein the inkjet layer micro-porous layer (MPL) formed on the surface of the gas diffusion layer (GDL).

9. The laminar structure as set forth in claim 8, wherein the micro-porous layer is provided as a porous graded structure based on adjustments of one or more of the electrospraying substance transport mode and the inkjet substance transport mode.

10. The laminar structure as set forth in claim 4, wherein one or more electrosprayed layers are formed, one or more inkjet layers are formed, and
the one or more electrosprayed layers and the one or more inkjet layers are continuously formed by a roll-to-roll manner.

11. A laminar structure for inclusion in a membrane-electrode assembly (MEA) of a polymer electrolyte membrane fuel cell (PEMFC), comprising an electrosprayed layer formed by lamination of an electrospraying ink, which is electrically charged in electric field, in an electrospraying process in which the electrospraying ink is dispersed and sprayed as electrospraying droplets, wherein
the electrospraying process sets an electrospraying substance transport mode according to adjustments of electrospraying process variables,
wherein the electrosprayed layer is a micro-porous layer (MPL) formed on a surface of a gas diffusion layer (GDL),
wherein the micro-porous layer is formed as a multi-layered structure which includes:
a first layer with dot-shaped patterns;
a second layer formed by droplets smaller than droplets forming the first layer, which is disposed on and in contact with the first layer; and
a third layer with dot-shaped patterns, which is disposed on and in contact with the second layer, the third layer being formed by droplets larger than the droplets forming the second layer,
wherein the first, second and third layers are stacked in a thickness direction of the micro-porous layer.

12. The laminar structure as set forth in claim 11, wherein the micro-porous layer further includes a fourth layer formed by droplets smaller than the droplets forming the first and third layers, which is disposed on and in contact with the third layer,
wherein the first, second, third and fourth layers are stacked in the thickness direction of the micro-porous layer.

13. A laminar structure for inclusion in a membrane-electrode assembly (MEA) of a polymer electrolyte membrane fuel cell (PEMFC), comprising an electrosprayed layer formed by lamination of an electrospraying ink, which is electrically charged in electric field, in an electrospraying process in which the electrospraying ink is dispersed and sprayed as electrospraying droplets, wherein
the electrospraying process sets an electrospraying substance transport mode according to adjustments of electrospraying process variables,
wherein the electrosprayed layer is a catalytic electrode layer of a laminated structure made of multiple layers, which include:
a first layer formed of a first catalyst material in which a first adjusted content of platinum (Pt) is contained; and
a second layer formed on the first layer, the second layer being formed of a second catalyst material in which a second adjusted content of platinum (Pt) is contained,
wherein the first and second layers are stacked in a thickness direction of the catalytic electrode layer.

14. A laminar structure for inclusion in a membrane-electrode assembly (MEA) of a polymer electrolyte membrane fuel cell (PEMFC), comprising an electrosprayed layer formed by lamination of an electrospraying ink, which is electrically charged in electric field, in an electrospraying process in which the electrospraying ink is dispersed and sprayed as electrospraying droplets, wherein the electrospraying process sets an electrospraying substance transport mode according to adjustments of electrospraying process variables,
wherein the electrosprayed layer is a catalytic electrode layer of a laminated structure made of multiple layers, each of the multiple layers being formed of a catalyst material in which a constant platinum (Pt) content is contained, wherein the multiple layers include:
a first layer formed of a first adjusted weight ratio of the catalyst material; and
a second layer formed of a second adjusted weight ratio of the catalyst material,
wherein the first and second layers are stacked in a thickness direction of the catalytic electrode layer.

* * * * *